US008869770B2

(12) United States Patent
Bazyn et al.

(10) Patent No.: US 8,869,770 B2
(45) Date of Patent: Oct. 28, 2014

(54) COMPRESSION IGNITION ENGINE HAVING FUEL SYSTEM FOR NON-SOOTING COMBUSTION AND METHOD

(75) Inventors: Timothy Bazyn, Chillicothe, IL (US); Christopher Gehrke, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 492 days.

(21) Appl. No.: 13/162,652

(22) Filed: Jun. 17, 2011

(65) Prior Publication Data

US 2012/0318233 A1  Dec. 20, 2012

(51) Int. Cl.
| | |
|---|---|
| F02B 1/12 | (2006.01) |
| F02B 1/14 | (2006.01) |
| F02B 23/06 | (2006.01) |
| F02M 61/18 | (2006.01) |
| F02B 3/06 | (2006.01) |
| F02M 63/02 | (2006.01) |

(52) U.S. Cl.
CPC .............. *F02B 23/0669* (2013.01); *F02B 1/14* (2013.01); *F02B 23/0684* (2013.01); *F02B 1/12* (2013.01); *Y02T 10/125* (2013.01); *F02B 3/06* (2013.01); *F02B 23/0651* (2013.01); *F02B 23/0696* (2013.01); *F02B 2275/14* (2013.01); *Y02T 10/123* (2013.01); *F02M 63/0225* (2013.01); *F02M 61/182* (2013.01)
USPC ............................. 123/305; 123/275; 123/279

(58) Field of Classification Search
CPC .......... F02B 1/12; F02B 1/14; F02B 23/0684; F02B 23/0646; F02M 61/182; F02M 61/1846

USPC .......... 123/253, 261, 269, 275, 279, 294, 305
See application file for complete search history.

(56) References Cited

U.S. PATENT DOCUMENTS

| | | | | |
|---|---|---|---|---|
| 1,498,273 A | * | 6/1924 | Hesselman | 123/276 |
| 1,088,666 A | | 10/1967 | Morris | |
| 4,779,587 A | * | 10/1988 | Schweinzer et al. | 123/276 |
| 4,919,093 A | | 4/1990 | Hiraki et al. | |

(Continued)

FOREIGN PATENT DOCUMENTS

| | | |
|---|---|---|
| JP | 5970874 | 4/1984 |
| JP | 60147525 | 8/1985 |
| WO | 93/14312 | 7/1993 |
| WO | 2009-067495 | 5/2009 |

OTHER PUBLICATIONS

L M Pickett and D L Siebers; Soot formation in deisel fuel jets near the lift-off length; Int. J. Engine Res.; prior to Jan. 1, 2007; pp. 103-130; vol. 7.

(Continued)

*Primary Examiner* — Thomas Moulis
(74) *Attorney, Agent, or Firm* — Liell & McNeil (57) ABSTRACT

A direct injection compression ignition internal combustion engine includes a fuel system having a nozzle extending into a cylinder of the engine and a plurality of spray orifices formed in the nozzle. Each of the spray orifices has an inner diameter dimension of about 0.09 mm or less, and define inter-orifice angles between adjacent spray orifice center axes of about 36° or greater such that spray plumes of injected fuel from each of the spray orifices combust within the cylinder according to a non-sooting lifted flame and gas entrainment combustion pattern. Related methodology is also disclosed.

23 Claims, 3 Drawing Sheets

(56) References Cited

U.S. PATENT DOCUMENTS

| | | | |
|---|---|---|---|
| 5,167,210 A * | 12/1992 | Leroy | 123/300 |
| 5,353,992 A | 10/1994 | Regueiro | |
| 5,392,745 A | 2/1995 | Beck | |
| 5,449,121 A | 9/1995 | El-Darazi et al. | |
| 6,070,813 A | 6/2000 | Durheim | |
| 6,382,179 B1 * | 5/2002 | Hansson | 123/305 |
| 6,513,487 B1 * | 2/2003 | Jorach et al. | 123/299 |
| 6,553,960 B1 | 4/2003 | Yoshikawa et al. | |
| 6,659,074 B2 | 12/2003 | Lippert et al. | |
| 6,742,493 B2 * | 6/2004 | Ziegler et al. | 123/305 |
| 6,918,549 B2 | 7/2005 | Theodorof | |
| 6,935,303 B2 * | 8/2005 | Eismark et al. | 123/299 |
| 7,201,135 B2 | 4/2007 | Vachon | |
| 7,347,182 B2 * | 3/2008 | Vogel et al. | 123/305 |
| 7,444,980 B2 * | 11/2008 | Cavanagh et al. | 123/299 |
| 7,823,557 B2 * | 11/2010 | Hunter et al. | 123/298 |
| 7,909,271 B2 * | 3/2011 | Cavanagh et al. | 239/533.12 |
| 7,918,206 B2 * | 4/2011 | Eismark et al. | 123/298 |
| 8,011,600 B2 * | 9/2011 | Gray, Jr. | 239/5 |
| 2005/0150979 A1 | 7/2005 | Gokhale et al. | |
| 2006/0201478 A1 | 9/2006 | Vachon | |
| 2006/0261193 A1 | 11/2006 | Vogel et al. | |
| 2008/0142622 A1 | 6/2008 | Gray | |
| 2008/0314360 A1 * | 12/2008 | Hou | 123/305 |
| 2010/0012080 A1 * | 1/2010 | Hokkanen et al. | 123/299 |

OTHER PUBLICATIONS

New Methods Produce Low-Temperature, Soot-Free Deisel Combustion; Vehicle Technologies Program; prior to Nov. 10, 2005; pp. 1-2; U.S. Department of Energy; website: http://www1.eere.energy.gov/wehiclesandfuels/fcvt_feature_new_methods.html.

* cited by examiner

COMPRESSION IGNITION ENGINE HAVING FUEL SYSTEM FOR NON-SOOTING COMBUSTION AND METHOD

STATEMENT OF GOVERNMENT INTEREST

The present invention was made with government support pursuant to Department of Energy Contract No. DE-FC26-05NT42412. The United States Government may have certain rights in the present patent application.

TECHNICAL FIELD

The present disclosure relates generally to a direct injection compression ignition internal combustion engine, and relates more particularly to combusting a fuel within an engine cylinder according to a non-sooting lifted flame and gas entrainment combustion pattern.

BACKGROUND

Various regulations have been in place for years to limit certain emissions from internal combustion engines, notably compression ignition diesel engines. Engineers have devised many different aftertreatment mechanisms for diesel engines which reduce undesired emissions such as nitrogen oxides, unburned hydrocarbons, carbon monoxide, and particulate matter. Engineers have also known for many years that various aspects of engine operation could be varied to influence the chemical composition of engine exhaust rather than simply treating the exhaust once generated. One example relates to the insight that relatively hotter in-cylinder temperatures tend to be associated with reduced emissions of particulate matter, notably soot. High in-cylinder temperatures tend to promote the oxidation of soot particles within the engine cylinders. Hotter temperatures, however, also tend to be associated with increased emissions of undesired nitrogen oxides or "NOx" and may stress engine hardware. Tradeoffs such as this have limited certain operating methodologies from reaching their full theoretical potential.

Many compression ignition diesel engines are equipped with exhaust particulate filters. While generally effective at preventing soot emissions, such filters add significant cost to the engine system, and may also cause performance degradation due to high back pressure and/or fuel consumption penalties due to the need to regenerate such filters periodically. As an effort to reduce the frequency with which exhaust particulate filters need to be regenerated, combustion scientists have developed a variety of strategies for increasing the tendency towards oxidizing soot within cylinders of the engine without having other, unwanted effects on the engine or its emissions. Various engine geometries and operating patterns have been proposed to enhance mixing of gaseous combustion products within the cylinder to burn up as much soot as possible. Other strategies utilize fuel additives. U.S. Pat. No. 7,201,135 to Vachon utilizes a combination of factors such as bore size, injector spray orifice size, and injection pressure to achieve low smoke output in a power dense diesel engine. Despite advances in this actively researched field, there remains ample room for improvement.

SUMMARY OF THE DISCLOSURE

In one aspect, a direct injection compression ignition internal combustion engine includes an engine housing defining a cylinder, and a piston movable between a bottom dead center position and a top dead center position within the cylinder. The engine further includes a fuel system having a fuel supply, and a fuel injector having an injector body defining a fuel inlet fluidly connected with the fuel supply, the injector body further having a nozzle extending into the cylinder and defining a nozzle supply passage configured to convey a fuel between the fuel inlet and a plurality of spray orifices formed in the nozzle and each defining a spray orifice center axis. The spray orifices each have an inner diameter dimension in a direction normal to the corresponding center axis of about 0.09 millimeters or less and define inter-orifice angles between adjacent center axis of about 36° or greater, such that spray plumes of injected fuel from each of the spray orifices combust within the cylinder according to a non-sooting lifted flame and gas entrainment combustion pattern.

In another aspect, a method of combusting a mixture of fuel and air in a direct injection compression ignition internal combustion engine includes increasing a pressure within a cylinder of the internal combustion engine to an autoignition threshold, and spraying fuel from a plurality of spray orifices of a fuel injector into the cylinder. The method further includes combusting a mixture of the fuel and air within the cylinder according to a non-sooting lifted flame and gas entrainment combustion pattern.

In still another aspect, a fuel system for non-sooting combustion of a directly injected fuel in a compression ignition internal combustion engine having an in-cylinder temperature at a piston top dead center position of about 750° C. or less and an effective compression ratio of about 15:1 or less, includes a supply of pressurized fuel, and a fuel injector including an injector body having a nozzle. The injector body defines a fuel inlet fluidly connected with the supply of pressurized fuel and a nozzle supply passage configured to convey fuel between the fuel inlet and a plurality of spray orifices formed in the nozzle. The spray orifices are nine or fewer in number and each define a spray orifice center axis. The spray orifices each further have an inner diameter dimension in a direction normal to the corresponding center axis of about 0.09 millimeters or less and define inter-orifice angles between adjacent center axes of about 36° or greater, such that upon injecting the fuel at a pressure of about 250 MPa or greater into a cylinder of the internal combustion engine the fuel non-sootingly combusts with air therein.

DETAILED DESCRIPTION

Figure 1:
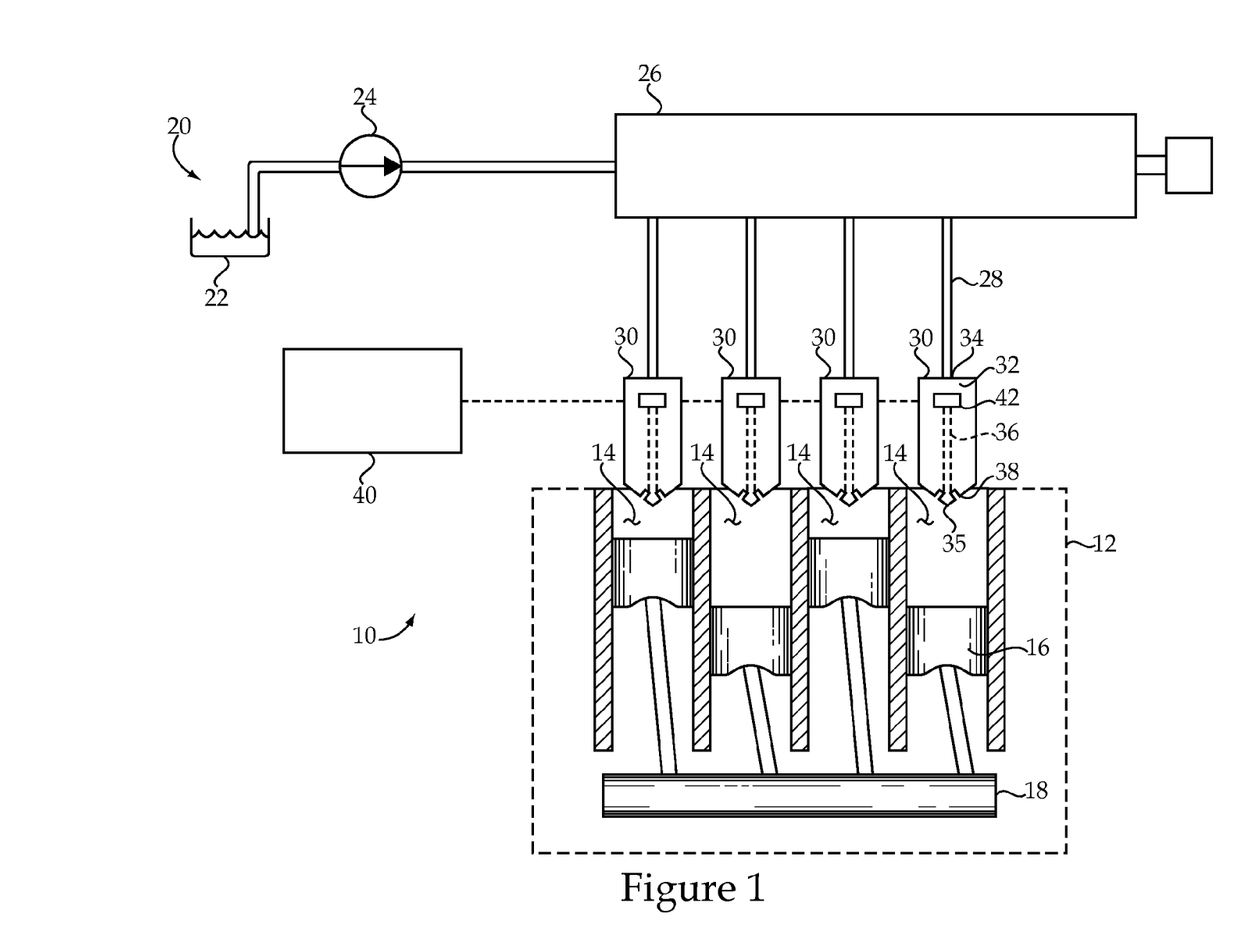
FIG. 1 is a partially sectioned side diagrammatic view of an engine according to one embodiment.

Referring to FIG. 1, there is shown a direct injection compression ignition internal combustion engine 10 according to one embodiment. Engine 10 may include an engine housing 12 defining one or more cylinders 14. In the illustrated embodiment, engine housing 12 defines a total of four cylinders, each of the cylinders having a piston 16 movable therein between a bottom dead center position and a top dead center position within the corresponding cylinder in a conventional manner. A crankshaft 18 is shown coupled with pistons 16 and is rotatable in a conventional manner such as to provide motive power to wheels or tracks of an associated machine. Engine 10 might also be configured to power a generator, compressor, pump, or any of a variety of other mechanisms. Engines and related hardware and methodology according to the present disclosure may be implemented where it is desirable to produce very low levels of certain emissions, notably particulate matter such as soot, for reasons which will be apparent from the following description.

Engine 10 may further include a fuel system 20 having a fuel supply 22 such as a fuel tank, and a fuel injector 30 having an injector body 32. A plurality of fuel injectors 30 may be provided and associated one with each of cylinders 14 such that a nozzle 35 of each fuel injector body 32 extends into a corresponding one of cylinders 14. In a practical implementation strategy, fuel system 20 further includes a high pressure fuel pump 24 coupled with a common rail 26. A plurality of fuel conduits 28 may be provided such that pressurized fuel from common rail 26 may be supplied to each of fuel injectors 30. As an alternative to a common rail strategy, embodiments are contemplated in which unit pumps are provided and coupled with or part of each of fuel injectors 30.

Engine 10 may further include an electronic control unit 40 in control communication with a plurality of electrical actuators 42, with one of electrical actuators 42 being coupled with each of fuel injectors 30 to control a start of injection and an end of injection of the associated fuel injector 30 into the corresponding cylinder 14. Those skilled in the art will be familiar with a variety of fuel injection strategies whereby an electrically actuated valve or the like is used to controllably supply pressurized fuel to a fuel injector nozzle for spraying into an engine cylinder. To this end, each of electrical actuators 42 may be configured, in response to control signals from electronic control unit 40, to fluidly connect a nozzle supply passage 36 defined by each of injector bodies 32 with fuel conduits 28. Fuel pressurization plungers might also be provided and coupled with each of fuel injectors 30 to raise a pressure of the fuel to a pressure greater than that supplied by the common rail. The present disclosure is not limited to any particular fuel pressurization, injection timing, or injection control strategy except as otherwise discussed herein. Similarly, while a liquid diesel distillate fuel will likely be used, the present disclosure is also not limited with regard to fuel type.

Each of injector bodies 32 may further define a fuel inlet 34 fluidly connected with common rail 26 or another suitable fuel supply, and a plurality of spray orifices 38 formed in the corresponding nozzle 35 such that nozzle supply passage 36 can convey fuel between the fuel inlet 34 and spray orifices 38. As further described herein, parameters relating to a size and arrangement and number of spray orifices 38, a pressure of fuel injected or sprayed via each fuel injector 32, and still other factors relating to in-cylinder temperatures, compression ratio or effective compression ratio, and geometric characteristics of piston 16 may be tailored such that fuel injected into cylinders 14 non-sootingly combusts with air therein. In particular, the foregoing and possibly other factors may be selected to promote a pattern of combustion whereby spray plumes of injected fuel from spray orifices 38 combust within the corresponding cylinder 14 according to a non-sooting lifted flame and gas entrainment combustion pattern, enabling combustion without forming soot in the first place, in contrast with known techniques which seek to oxidize soot after it is formed. Further details of the subject non-sooting lifted flame and gas entrainment combustion pattern and how various engine configuration and operating parameters can be tailored to combust a mixture of fuel and air without forming soot will be further apparent from the following description.

Figure 2:
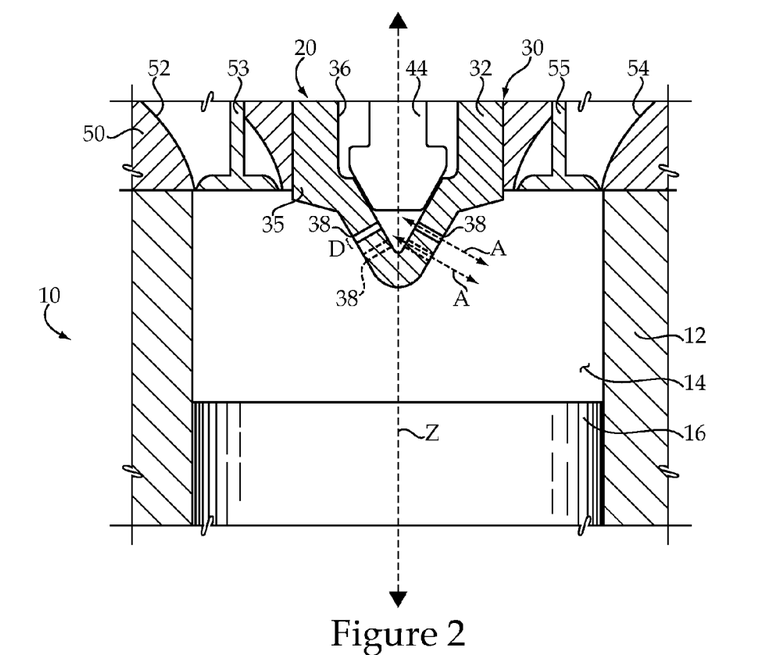
FIG. 2 is a partially sectioned side diagrammatic view of a portion of the engine of FIG. 1.

Referring also now to FIG. 2, there is shown a close up view of engine 10 illustrating additional details. Fuel injector 30 is shown extending into cylinder 14 and arranged approximately such that piston 16 and injector body 32 share a common center axis Z, also an axis of reciprocation of piston 16. Also shown in FIG. 2 is an engine head 50 coupled with engine housing 12, and defining an intake passage 52 wherein a conventional intake valve 53 is positioned. Engine head 50 also defines an exhaust passage 54 having an exhaust valve positioned therein. While only one intake valve and one exhaust valve are shown in FIG. 2, it should be appreciated that multiple ones of each of these might be used without departing from the scope of the present disclosure. As further described herein, variable valve actuation of at least intake valve 53 may be used to tailor conditions within cylinder 14 to promote non-sooting combustion. It will be recalled that a control valve or the like may be part of fuel injector 30. To this end, a check 44 is shown positioned within injector body 32 as it might appear when fuel is not being injected via injector 30, but will be understood to be movable to fluidly connect passage 36 with spray orifices 38 for injection of fuel. A hydraulically actuated electronically controlled valve (not shown) may be coupled with the corresponding electrical actuator 42 for controlling opening and closing of check 44 in a known manner, typically utilizing a pressure of fuel acting on hydraulic surfaces of check 44.

Two of spray orifices 38 are shown in the section plane of FIG. 2, whereas an additional two spray orifices 38 are shown in phantom. It may be noted that spray orifices 38 can be arranged in two rows about axis Z, each of the rows being at a different axial position within nozzle 35. Orifices 38 may be staggered within the two rows in a generally alternating pattern further described herein. Each of orifices 38 is also shown angled downward in a radially outward direction from axis Z. Spray orifices 38 are further shown at equal angles relative to a vertical line defined by axis Z. Either of these characteristics, arrangement of orifices 38 and/or orientations of orifices 38 might be varied without departing from the scope of the present disclosure except as otherwise taught herein.

As alluded to above, certain characteristics of spray orifices 38 have been discovered to influence the tendency for non-sooting combustion of fuel in engine 10 to occur. One such characteristic or factor relates to a size of orifices 38. Each of spray orifices 38 defines a center spray orifice axis, two of which are shown and labeled via reference letter A in FIG. 2. Spray orifices 38 may each include an inner diameter dimension in a direction normal to the corresponding spray orifice center axis of about 0.09 mm or less. Forming spray orifices of this relatively small size has been found to assist in entraining sufficient air upstream of the start of combustion into a fuel spray plume per unit fuel injected to promote non-sooting combustion. The relative amount of air entrained upstream of the start of combustion may be such that an amount of oxygen entrained into spray plumes from each one of spray orifices 38 is greater than about 30% of a stoichiometric amount of oxygen for the amount of fuel injected, or typically equal to about 50% of the stoichiometric amount or greater. The term "about" should be understood herein in the context of rounding to equal numbers of significant digits. Accordingly, about 0.09 mm means from 0.085 mm to 0.094 mm. About 30% means from 25% to 34%. A similar convention applies to descriptions of the size of angles given in degrees, as well as compression ratios. For instance, a compression ratio of about 15:1 or less means from 14.5:1 to 15.4:1, or less than 14.5:1.

Returning to the subject matter of spray orifice geometry, it may be noted that each of spray orifices 38 in FIG. 2 is straight and axially uniform in shape. Stated another way, each of spray orifices 38 includes a uniform shape regardless of which location relative the corresponding center axis A is being considered. The present disclosure is not thereby limited, however, and tapered or otherwise non-uniformly shaped spray orifices might be used. In still further embodiments, spray orifices having an inner diameter dimension of about 0.08 mm or less may be used. In general terms, the smaller the spray orifice inner diameter the greater the amount of air entrained per unit fuel injected. In addition to spray orifice size, another factor discovered to influence the tendency for non-sooting combustion to occur is spray orifice number. It has been discovered that using a number of spray orifices equal to 9 or less can assist in promoting non-sooting combustion. This is believed to be due to limiting interaction of adjacent spray plumes with one another. Spray plume interaction can reduce liftoff length and/or affect the pattern of gas flow, and thus gas entrainment within an engine cylinder, in ways that reduce the tendency for non-sooting combustion to occur. Where liftoff length is reduced, less air per unit fuel may be entrained within spray plumes. Where spray plumes interact to affect gas flow within the engine cylinder, in certain instances this can cause gaseous combustion products to make their way towards the base of spray plumes and thus become entrained in a spray plume before fuel injection ends. Each of these properties of liftoff length and gas entrainment and how they may be tailored are further discussed below.

Other factors which can influence the tendency for non-sooting combustion to take place relate to geometry and displacement of piston 16. It has been discovered that an engine size, at least in terms of piston displacement, which is toward the lower end of a size range of commercially available conventional diesel engines, may provide a practical implementation strategy for achieving non-sooting combustion. In particular, piston 16 may have a displacement from about 1 liter to about 2 liters, and in one particular embodiment may have a displacement equal to about 1.1 liters. In such an engine, it has been found that non-sooting combustion may occur at brake mean effective pressures up to about 1060 kilopascals, but possibly higher. Larger engines and higher load operation may be less amenable to the phenomena giving rise to non-sooting combustion. It has further been discovered that using a piston defining a piston bowl, and in particular a piston bowl having a non-reentrant profile shaped to inhibit entrainment of gaseous combustion products into fuel spray plumes can promote non-sooting combustion. In a practical implementation strategy, combustion may occur at least predominantly within a piston bowl.

Figure 3:
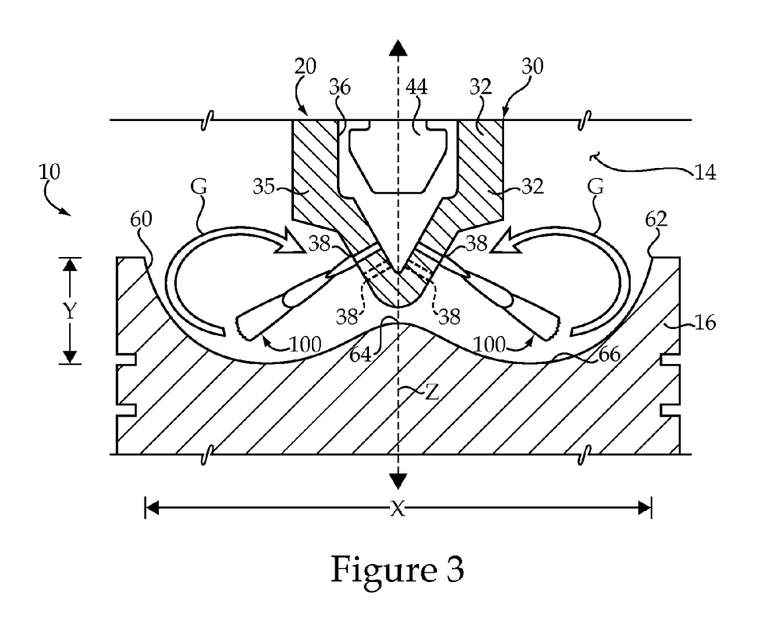
FIG. 3 is a sectioned side diagrammatic partial view of a portion of the engine of FIG. 1.

Turning to FIG. 3, there is shown a more detailed view of piston 16 illustrating certain features relating to these goals. In the embodiment shown piston 16 defines a piston bowl 60 bounded by a bowl rim 62 formed in an axial end of piston 16. Piston bowl 60 may include a convex inner bowl surface 64 and a concave outer bowl surface 66 extending from convex inner bowl surface 64 to rim 62. As mentioned above, piston bowl 60 may have a non-reentrant profile. This should be understood to mean that a slope of the outer sides of piston bowl 60 may be such that the bowl does not begin to curve back towards a center of cylinder 14. Stated another way, bowl rim 62 adjoins the radially outermost part of bowl 60. A radius of curvature defined by concave outer bowl surface 66 may be about 10 mm or greater, and will likely be about 12 mm or greater. As a profile of piston bowl 60 is followed moving outwardly towards bowl rim 62, the surface of bowl 60 will typically not reach or exceed a point at which the piston bowl surface is parallel to axis Z.

In FIG. 3, arrows G identify generally a flow of gaseous combustion products from spray plumes 100 propagating outwardly from spray orifices 38. It may be noted that arrows G indicate that gaseous combustion products indeed return towards spray orifices 38, and thus return towards spray plumes 100. In view of the above considerations as to piston bowl profile, however, it will be understood that piston bowl 60 is typically not shaped to direct gaseous combustion products towards a center of cylinder 14. This feature is believed to enable fuel spraying and combustion without gaseous combustion products from being entrained within the spray plumes. In other words, spraying of fuel may be stopped prior to gaseous combustion products becoming entrained into the spray plumes 100. In a re-entrant piston bowl design it would likely be more difficult to complete fuel injection prior to entraining gaseous combustion products, at least when using an engine otherwise designed in accordance with the present disclosure. Other geometric attributes found to be advantageous in promoting non-sooting combustion relate similarly to goals of preventing entrainment of gaseous combustion products into spray plumes 100. To this end, piston bowl 60 may be relatively wide and relatively shallow. In one embodiment, piston bowl 60 may have a bowl diameter defined by a line extending through axis Z and intersecting opposite sides of bowl rim 62 which is from about 50 mm to about 200 mm. This dimension is shown via reference letter X in FIG. 3. A depth of piston bowl 60 is shown via reference letter Y and may be from about 10 mm to about 20 mm. In a practical implementation strategy, the diameter of piston bowl 60 may be greater than about 75 mm, and the depth of the piston bowl may be less than about 15 mm.

Figure 4:
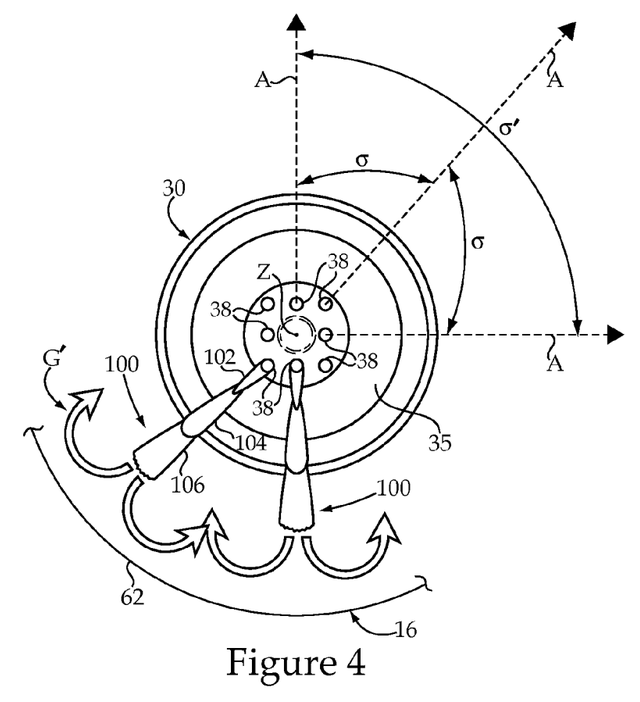
FIG. 4 is an end view of a fuel injector pictorially illustrating combustion according to the present disclosure.

Referring also now to FIG. 4, there is shown an end view of fuel injector 30 illustrating still further features which may influence the tendency for non-sooting combustion. The two staggered rows of spray orifices 38 in nozzle 35 are readily apparent in FIG. 4, numbering eight in total. Also shown are angles defined by spray orifice center axes A. It will be recalled that limiting interaction among spray plumes can further both the goals of maximizing liftoff length and preventing entrainment of gaseous combustion products. To this end, the orientations of spray orifices 38 in nozzle 35 may be selected such that the spray plumes remain far enough apart in space that liftoff length is not reduced by interaction among the plumes, nor is the flow of gas within the cylinder affected such that entrainment of gaseous combustion products occurs. It has been discovered that angles between adjacent spray orifice center axes, and by implication angles between center axes of adjacent spray plumes, should be equal to about 36° or greater. In FIG. 4, two angles each labeled θ are shown which represent angles between adjacent spray orifice center axes. A larger angle θ' is defined by spray orifice center axes which are not adjacent but are on opposite sides of the spray orifice whose center axis forms one of the lines defining each of the two angles θ. It may thus be noted that the inner row of spray orifices 38 may be positioned such that a spray orifice is located about every 90° around a circle. A similar arrangement may be used for spray orifices 38 in the outer row. Since spray orifices 38 may themselves be angled relative to longitudinal axis Z, angle θ' may actually be less than 90°, but appears to be at 90° in the projection of FIG. 4. Similarly, angles θ appear to be about 45°, but may analogously be equal to less than 45°. In a practical implementation strategy, no two center axes of any two spray orifices 38 in injector 30 will define an angle less than about 36°, and will typically include angles of about 38° or greater. Where a lesser number of spray orifices is used, such as 6 or 7, the angles between center axes of adjacent spray orifices could be relatively larger than that of an 8 orifice design.

Also shown in FIG. 4 are a set of arrows G' representing flow paths of gaseous combustion products from two illustrated spray plumes 100. Spray plumes are not shown from the other orifices for clarity, but would be present. It may be noted that gaseous combustion products may flow outwardly from spray plumes 100, and impinge upon piston 16, and then curve back towards a base of spray plumes 100. The flow paths illustrated by arrows G' in FIG. 4 may be understood as lateral flow paths, in contrast to the vertical flow paths represented via arrows G in FIG. 3. A real world engine would typically exhibit both lateral and vertical, and possibly still other, flow paths. Those skilled in the art will appreciate that arrows G and G' are somewhat idealized. It will also be understood by those skilled in the art that gaseous combustion products may flow in numerous directions outwardly from spray plumes, and by impinging upon piston 16, or other portions of engine 10 such as engine head 50, begin to generally curve back towards the spray plumes. As mentioned above, entraining gaseous combustion products into spray plumes 100 is generally undesirable, as such may disturb the conditions needed for non-sooting combustion. The middle two arrows G' in FIG. 4 are shown overlapping slightly with one another. It is believed that gaseous combustion products from adjacent spray plumes can collide and mix and generate flow patterns which tend to cause the combustion products to impinge upon spray plumes earlier than desired. By spacing orifices 38 from one another as discussed herein, and to a certain extent by using spray orifices having the described geometries, preventing or at least minimizing the interaction between the gaseous combustion products from adjacent spray plumes which tends to lead to entrainment within the spray plumes is possible. For this and other reasons described herein it becomes possible to spray fuel, entrain sufficient air, and avoid entrainment of gaseous combustion products, such that non-sooting combustion occurs.

It will be recalled that the present disclosure contemplates lifted flame combustion, at least for the reason that lifted flame promotes the entrainment of more air per unit fuel than conventional strategies. Injection pressure is a factor which can directly influence liftoff length. In FIG. 4, three different portions of one of the illustrated spray plumes 100 is shown, indicated by reference numerals 102, 104 and 106. In FIG. 4, reference numeral 102 denotes a base portion of spray plume 100 comprised of fuel droplets, fuel vapor, and entrained air. An outer tip of base portion 102 of spray plume 100 may be understood to define a liquid length of spray plume 100, as such is known in the art. An adjoining middle portion 104 of spray plume 100 is comprised of vaporized fuel and air. A distance from the orifice outer tip of portion 104 is generally understood as a liftoff length of spray plume 100, whereas the remaining, end portion 106 of spray plume 100 includes a flame region. A start of combustion point in a spray plume according to the present disclosure may lie at an interface between portions 104 and 106. The term "upstream of a start of combustion" as used herein means upstream this interface. Those skilled in the art will thus understand that the actual diffusion flame of each spray plume 100 will typically commence approximately at the interface of portions 104 and 106. Conventional combustion is typically characterized by a relatively longer liquid length of a spray plume, which can overlap with the actual flame portion such that there is no true counterpart to portion 104. Conventional lifted flame combustion may include a liftoff length similar to that depicted as portion 104 in FIG. 4. Conventional lifted flame combustion differs from non-sooting combustion according to the present disclosure in that soot formation tends to occur in the flame portion of the spray plume in conventional lifted flame combustion whereas in the present disclosure sufficient air has been entrained to prevent the formation of soot in the flame portion of the plume.

Another way to understand this principle is that a greater percentage of a stoichiometric amount of oxygen may be entrained upstream of the start of combustion point in a spray plume in non-sooting combustion than that which occurs typically in conventional lifted flame combustion. For reasons explained above, injection pressure, spray orifice size, and spray orifice orientations, assist in achieving sufficient liftoff length for achieving these goals. Relatively cool in-cylinder temperatures do as well, as further discussed below. As a result, the reaction pathways tending to lead to soot formation do not occur, or at least not substantially. Under at least certain conditions, entraining sufficient air such that the oxygen content within the spray plume is about 50% or more of a stoichiometric amount of oxygen for the given amount of fuel is sufficient to prevent soot formation. In certain embodiments, sufficient oxygen may be entrained within spray plumes 100 to reach about 60% or more of a stoichiometric amount of oxygen.

Still another factor discovered to influence the tendency for non-sooting combustion to occur relates to in-cylinder temperatures when combustion occurs. Higher temperatures are believed to be associated with reduced liftoff length, and thus reduced air entrainment upstream of the start of combustion. In general terms, in-cylinder temperatures lower than that typically found in conventional compression ignition engines will thus tend to promote non-sooting combustion. It may be noted that certain conventional combustion strategies may seek relatively high temperatures for the purpose of oxidizing soot and other design considerations. Those skilled in the art will readily appreciate that there are a multiplicity of ways in which in-cylinder temperatures can be controlled. From the standpoint of basic hardware, certain engines according to the present disclosure may include compression ratios of about 15:1 or less, and which may be about 14:1 or less. In other instances, the compression ratio in conventional terms as a ratio of volumes may be similar to that used in a conventional compression ignition engine, but other operating parameters may be varied to render an effective compression ratio of about 15:1 or less, or even 14:1 or less. Variable valve actuation might be used. For instance, holding open intake valve 53 past a normal closing timing can be used to reduce pressurization of air within cylinder 14 to yield an effective compression ratio of about 15:1 or less, or about 14:1 or less, even where engine 10 is configured such that the conventionally defined compression ratio would actually be higher. Charge air cooling may also be used to reduce the combustion chamber temperature of engine 10. To this end, engine 10 may be equipped with a turbocharger and an aftercooler such that a temperature of air supplied to cylinder 14 is lower than what might otherwise be provided. In a practical implementation strategy, regardless of what technique is used for attaining effective compression ratios as described herein, an in-cylinder temperature at a top dead center position of piston 16 may be equal to about 750° C. or less. Spraying of fuel from spray orifices 38 might also commence slightly after piston 16 reaches a top dead center position, such that the fuel is sprayed into slightly cooler temperature air than that which would exist at the top dead center position of piston 16.

As also alluded to above, a pressure of fuel injected/sprayed from spray orifices 38 can affect liftoff length and thus air entrainment of spray plumes 100. In general terms, the higher the injection pressure the greater the liftoff length. The greater the liftoff length, the more air entrainment prior to the end of the liftoff length. It has been found that pressurizing fuel prior to commencing spraying the fuel from orifices 38 to a pressure of about 250 MPa, and in many instances to a greater pressure, about 300 MPa or still higher, is sufficient to promote the relatively long liftoff lengths desired for non-sooting combustion.

Figure 5:
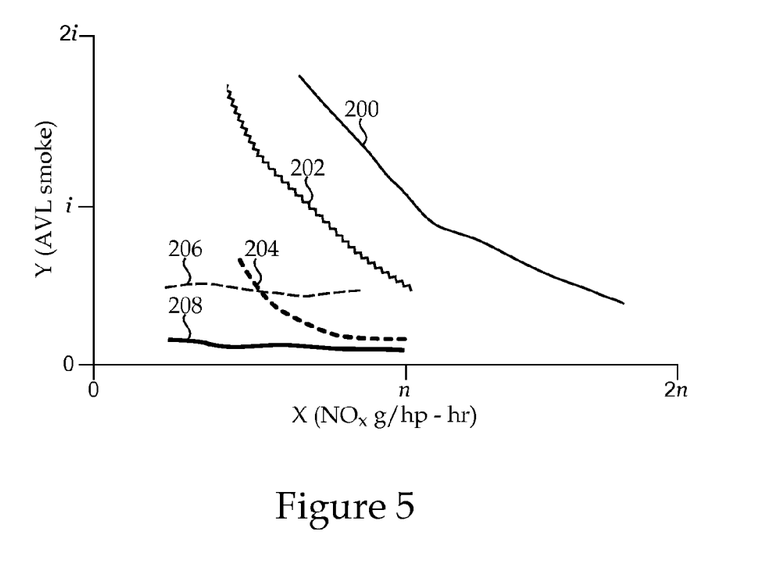
FIG. 5 is a graph of smoke output compared with grams NOx per horsepower-hour for a plurality of different fuel system configurations in an internal combustion engine.

Referring now to FIG. 5, there is shown a graph comparing smoke amount on the Y-axis with NOx grams per horsepower-hour on the X-axis. On the Y-axis, a quantity i indicates a first amount of smoke, whereas another quantity 2i represents an approximately twofold increase in smoke amount. On the X-axis, a first NOx gram per horsepower hour amount n is shown, as is a second amount 2n which is approximately a twofold increase. The graph of FIG. 5 is thus qualitative, but is expected to enable those of ordinary skill to recognize certain trends likely to be evident in data acquired during operating an internal combustion engine according to the present disclosure.

In FIG. 5, a first curve 200 represents data taken on a single cylinder engine using a fuel injector having 14 holes, at an injection pressure of about 300 MPa, and at an exhaust gas recirculation (EGR) amount of about 35%. Curve 202 represents a 10 hole injector at an injection pressure of about 225 MPa, and EGR of about 35%. Curve 204 represents data taken using a 10 hole injector at an injection pressure of about 300 MPa, and EGR of about 35%. Curve 206 represents data taken using a 6 hole injector, injection pressure of about 225 MPa, and 35% EGR, whereas curve 208 represents data taken using a 6 hole injector, injection pressure of about 300 MPa, and EGR of about 35%. In view of FIG. 5, trends toward lower smoke and lower NOx with a smaller number of spray orifices and with relatively higher injection pressures are readily apparent.

INDUSTRIAL APPLICABILITY

In view of the foregoing description, it will be appreciated that a variety of different factors may be controlled or designed into an internal combustion engine to achieve non-sooting combustion. While certain practical implementation strategies are disclosed herein, it is expected that varying the factors described as influencing or promoting non-sooting combustion may yield other "recipes" enabling non-sooting combustion. It is believed that preventing the formation of soot in the first place, rather than trying to oxidize or trap the soot after it has been formed, will be a superior strategy for at least certain engine applications. It is also possible that some soot particles will be detectable in exhaust from internal combustion engines according to the present disclosure. Thus, the term "non-sooting" should not necessarily be construed to suggest that literally zero particles of soot will be detected. It is nevertheless believed that operating an internal combustion engine according to the present disclosure may produce exhaust sufficiently free of soot particles that no exhaust particulate filter will be needed at all. One standard for determining whether an engine is operated according to the non-sooting principles described herein is whether the engine will produce a quantity of particles in its exhaust which might otherwise be expected for an engine equipped with an exhaust particulate filter. One applicable standard is the current European Union standard for emissions from diesel engines equipped with exhaust particulate filters, currently $8 \times 10^{11}$ particles per kilowatt-hour, measured downstream an exhaust particulate filter. Thus, an engine according to the present disclosure may in certain instances be expected to emit about $8 \times 10^{11}$ particles per kilowatt-hour or less, without an exhaust particulate filter.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A direct injection compression ignition internal combustion engine, comprising:
    an engine housing defining a cylinder;
    a piston movable between a bottom dead center position and a top dead center position within the cylinder; and
    a fuel system including a fuel supply, and a fuel injector having an injector body defining a fuel inlet fluidly connected with the fuel supply, the injector body further having a nozzle extending into the cylinder and defining a nozzle supply passage configured to convey a fuel between the fuel inlet and a plurality of spray orifices formed in the nozzle and each defining a spray orifice center axis,
    wherein each spray orifice of the plurality of spray orifices has an inner diameter dimension in a direction normal to the corresponding center axis of about 0.09 millimeters or less, and
    wherein the plurality of spray orifices defines inter-orifice angles between adjacent center axes of about 36° or greater, such that spray plumes of injected fuel from each spray orifices of the plurality of spray orifices burn within the cylinder according to a non-sooting lifted flame and gas entrainment combustion pattern.

2. The internal combustion engine of claim 1, wherein a total number of spray orifices in the plurality of spray orifices is equal to nine or less.

3. The combustion system of claim 2, wherein the total number of spray orifices in the plurality of spray orifices is equal to eight, and wherein the inter-orifice angles are about 38° or greater.

4. The combustion system of claim 3, wherein individual spray orifices in the plurality of spray orifices are arranged in staggered rows about the nozzle.

5. The internal combustion engine of claim 2, wherein the fuel injector is one of a plurality of fuel injectors, and
    wherien eah fuel injector in the plurality of fuel injectors is associated with one cylinder of a plurality of cylinders of the internal combustion engine, and
    wherein each fuel injector in the plurality of fuel injectors is fluidly connected with a high pressure fuel pump of the fuel system via a common rail.

6. The internal combustion engine of claim 5, further comprising a plurality of pistons each positioned at least partially within one of the plurality of cylinders,
    wherein each piston in the plurality of pistons is positioned at least partially within one cylinder of the plurality of cylinders and has a displacement from about 1 liter to about 2 liters.

7. The internal combustion engine of claim 1, wherein the piston defines a piston bowl having a non-reentrant profile shaped to inhibit entrainment of gaseous combustion products into the spray plumes of injected fuel.

8. The internal combustion engine of claim 7, wherein the piston is movable a stroke distance from the bottom dead center position to the top dead center position such that a compression ratio of the engine is about 15:1 or less.

9. The internal combustion engine of claim 7, wherein the piston bowl includes a concave outer bowl surface defining a radius of curvature of about 10 millimeters or greater, and wherein a diameter of the piston bowl is from about 50 millimeters to about 150 millimeters, and a depth of the piston bowl is from about 10 millimeters to about 20 millimeters.

10. A method of burning a mixture of fuel and air in a direct injection compression ignition internal combustion engine, comprising the steps of:
increasing a pressure within a cylinder of the internal combustion engine to an autoignition threshold;
spraying fuel from a plurality of spray orifices of a fuel injector into the cylinder to form the mixture of fuel and air; and
burning the mixture of fuel and air within the cylinder according to a non-sooting lifted flame and gas entrainment combustion pattern.

11. The method of claim 10, wherein the step of increasing the pressure includes increasing the pressure within the cylinder such that an effective compression ratio of the engine is about 15:1 or less at least in part via moving a piston from a bottom dead center position to a top dead center position within the cylinder.

12. The method of claim 11, wherein the step of spraying fuel commences subsequent to the step of increasing the pressure.

13. The method of claim 11, wherein the step of increasing the pressure further includes increasing the pressure such that an in-cylinder temperature is less than about 750° C. at the top dead center position of the piston.

14. The method of claim 11, further comprising pressurizing the fuel to a fuel pressure of about 250 MPa or greater prior to commencing the step of spraying the fuel.

15. The method of claim 14, wherein the step of pressurizing the fuel includes pressurizing the fuel to a fuel pressure of about 300 MPa or greater, and
wherein the step of spraying the fuel further includes spraying the fuel from a total of eight or fewer spray orifices.

16. The method of claim 10, further comprising entraining gases within the cylinder into spray plumes traveling outwardly from each spray orifice of the plurality of spray orifices, and
wherein the step of spraying the fuel further includes stopping spraying of the fuel prior to entraining gaseous combustion products into the spray plumes.

17. The method of claim 16, wherein the step of spraying the fuel further includes spraying the fuel such that angles between center axes of the spray plumes are about 36° or greater, and wherein the spray orifice of the plurality of spray orifices defines an inner diameter dimension of 0.09 millimeters or less.

18. The method of claim 15, wherein the step of burning the mixture of fuel and air further includes burning the mixture of fuel and air predominantly within a bowl formed in an end of the piston, and
wherein the piston has a displacement from about 1 liter to about 2 liters.

19. A fuel system for non-sooting combustion of a directly injected fuel in a compression ignition internal combustion engine having an in-cylinder temperature at a piston top dead center position of about 750° C. or less and an effective compression ratio of about 15:1 or less, comprising:
a supply of pressurized fuel; and
a fuel injector including an injector body having a nozzle, the injector body defining a fuel inlet fluidly connected with the supply of pressurized fuel and a nozzle supply passage configured to convey fuel between the fuel inlet and a plurality of spray orifices formed in the nozzle,
wherein a number of spray orifices of the plurality of spray orifices is nine or less,
wherein each spray orifice of the plurality of spray orifices defines a spray orifice center axis, and has an inner diameter dimension in a direction normal to the corresponding center axis of about 0.09 millimeters or less, and
wherein the plurality of spray orifices defines inter-orifice angles between adjacent spray orifice center axes of about 36° or greater, such that upon injecting the fuel at a pressure of about 250 MPa or greater into a cylinder of the internal combustion engine the fuel burns with air therein according to a non-sooting lifted flame pattern.

20. The fuel system of claim 19 wherein the inter-orifice angles are about 38°, and the inner diameter dimension of each spray orifice of the plurality of spray orifices is about 0.08 millimeters or less.

21. The internal combustion engine of claim 1, wherein the non-sooting lifted flame and gas entrainment combustion pattern results in a particulate emission from the internal combustion engine of about $8 \times 10^{11}$ particles per kilowatt-hour or less, without an exhaust particulate filter.

22. The method of claim 10, wherein the non-sooting lifted flame and gas entrainment combustion pattern results in a particulate emission from the internal combustion engine of about $8 \times 10^{11}$ particles per kilowatt-hour or less, without an exhaust particulate filter.

23. The fuel system of claim 19, wherein the non-sooting lifted flame pattern results in a particulate emission from the internal combustion engine of about $8 \times 10^{11}$ particles per kilowatt-hour or less, without an exhaust particulate filter.

* * * * *

UNITED STATES PATENT AND TRADEMARK OFFICE
CERTIFICATE OF CORRECTION

PATENT NO. : 8,869,770 B2
APPLICATION NO. : 13/162652
DATED : October 28, 2014
INVENTOR(S) : Bazyn et al.

Page 1 of 1

It is certified that error appears in the above-identified patent and that said Letters Patent is hereby corrected as shown below:

In the claims

Column 10, line 34, in Claim 1, delete "orifices" and insert -- orifice --.

Column 10, line 49, in Claim 5, delete "wherien eah" and insert -- wherein each --.

Column 10, lines 56-57, in Claim 6, delete "pistons each positioned at least partially within one of the plurality of cylinders," and insert -- pistons, --.

Column 12, line 1, in Claim 17, delete "the" and insert -- each --.

Signed and Sealed this
Tenth Day of November, 2015

Michelle K. Lee
*Director of the United States Patent and Trademark Office*